June 16, 1964 G. NATTA ETAL 3,137,683
1,2-ISOTACTIC POLYBUTADIENE AND PROCESS FOR PRODUCING THE SAME
Filed April 9, 1957
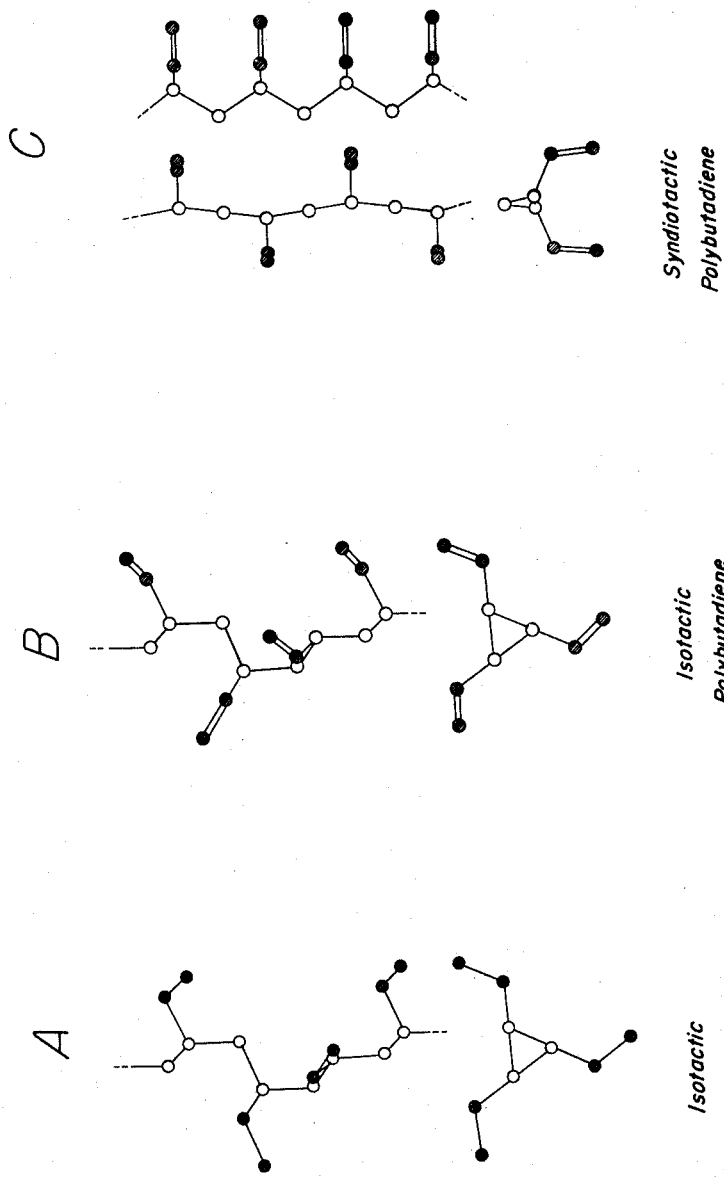
INVENTORS
GIULIO NATTA
LIDO PORRI
ATTILO PALVARINI

# United States Patent Office 3,137,683
Patented June 16, 1964

3,137,683
1,2-ISOTACTIC POLYBUTADIENE AND PROCESS FOR PRODUCING THE SAME
Giulio Natta and Lido Porri, Milan, and Attilio Palvarini, Menaggio, Italy, assignors to Montecatini Societa Generale per l'Industria Mineraria e Chimica, Milan, Italy
Filed Apr. 9, 1957, Ser. No. 651,606
Claims priority, application Italy Apr. 13, 1956
25 Claims. (Cl. 260—94.2)

This invention relates to new crystalline polymers of butadiene and to processes for producing them.

In the pending application of G. Natta et al., Ser. No. 614,040, filed July 13, 1956, now abandoned, there are disclosed new linear, crystalline butadiene polymers in the chain of which the arrangement of the units derived from the monomer is prevailingly 1,2.

The strucure of those new polybutadienes was established by an X-ray examination, and is based on a regularly alternating distribution of the tertiary carbon atoms having opposite steric configuration. Such a structure is characterized by the fact that, in the crystalline state, the main chains of the polymer are arranged in a plane and the substituent groups (—CH=CH$_2$) of each chain are arranged alternately, in regular order, one above and the other below, the main chain to which they are bound. The structure of those polybutadienes, which Natta has called "syndiotactic polybutadienes" is further characterized in that the period of identity of the elementary cell in the direction of the chain axis is 5.14 A., which corresponds to a 4-carbon atom segment of a plane paraffinic zig-zag chain.

The syndiotactic polybutadienes were obtained by polymerizing butadiene in an aliphatic or aromatic hydrocarbon solvent in the presence of a polymerization agent obtained by reacting organo-metallic compounds of the 1st to 3rd groups of the Periodic Table with oxygen-containing, non-halogenated compounds of transition metals, preferably of metals of the 1st sub-group of groups IV to VI of the Periodic Table.

Surprisingly, we have now found that among the compounds of the transition metals which can be used in preparing catalysts for the polymerization of butadiene, certain complex compounds of chromium as defined below represent a special case, particularly when the catalysts are prepared under certain conditions, and specifically with the use of a metalorganic compound of a metal of the 3rd group of the Periodic Table and the complex chromium compound in specific ratios. The polybutadiene obtained with the use of such catalysts has physical properties that are different from those of the syndiotactic polybutadiene. When this new polybutadiene is examined by infra-red spectography, it shows, in the chain, a prevailingly 1,2 arrangement of the units derived from the monomer, which arrangement is similar to that in the syndiotactic polybutadiene. However, when the new polybutadiene of the present invention is examined by X-rays, it shows a crystalline structure which is unquestionably different from that of the syndiotactic polybutadiene.

As we have mentioned above, the new polybutadiene has physical properties different from those of the syndiotactic polybutadiene. For instance, the first order transition temperature (roentgenographic melting point) for the polybutadiene produced by the present method is 120°C–125° C., whereas that of the syndiotactic polybutadiene is 154° C. Moreover, when fibers formed from the present polybutadiene are examined under the X-rays, it is found from the X-ray diffraction spectrum that the polymer has, in the crystalline state, an identity period along the axis of the fiber of 6.45 A., which corresponds to a 6-carbon atom segment of the chain. This should be contrasted with the identity period of 5.14 A. for the syndiotactic polybutadiene.

Isotactic polymers have been defined by one of us, G. Natta, as polymers in which the tertiary carbon atoms contained in the polymeric chains have, for very long sections of the chain, the same steric configuration.

It is interesting to observe that, aside from slight differences in the positions of certain reflections, the spectrum of the polybutadiene obtained by the present method is very similar to that of isotactic polybutene, as described in Makromol Chem. XXI (1951), pp. 240–244. The chains of the new polybutadiene have the same isotactic structure as the isotactic polybutene, differing therefrom only in the substituent groups on the tertiary carbon atom which, in the polybutadiene, are vinyl groups and, in the polybutene, are ethyl groups. The present polybutadiene is, therefore, an isotactic polymer as distinguished from the earlier syndiotactic polybutadiene.

That the new polybutadiene is characterized by the 1,2 isotactic structure is demonstrated by the presence in the infra-red spectrum of a strong band at 14.40μ and weaker bands, respectively, at 12.40, 11.42, 8.36 and 8.12μ. The isotactic structure is further evidenced by the absence of the bands at 15.02 and 12.70μ which are characteristic of the syndiotactic structure.

Various physical properties and roentgenographic data for the isotactic polybutadiene, the syndiotactic polybutadiene, and for isotactic polybutene are compared in Table I below.

TABLE I

| | 1,2 Syndiatactic Polybutadiene | 1,2 Isotactic Polybutadiene | Isotactic Polybutene [1] |
|---|---|---|---|
| Identity period | 5.14 A | 6.45 A | 6.45 A. |
| n° of the corresponding monomeric units | 2 | 3 | 3. |
| Chain structure in the crystals | Plane | Spiralized tertiary symmetry | Spiralized tertiary symmetry. |
| Density of crystals | 0.963 | 0.96 | 1. |
| Melting temperature (roentgenographic) | 154° C | 124° C | 126° C. |

[1] Form I (hexagonal).

In the accompanying drawing, FIGURE 1 shows projections of the chain structure, in the crystalline state, of the three types of polymers: (A) isotactic polybutene; (B) the present isotactic polybutadiene; and (C) the syndiotactic polybutadiene, from which the differences in the structures are evident. In the projections, the white dots indicate the carbon atoms of the main chain and the shaded dots indicate the carbon atoms in the side chains. The similarities between the two isotactic polymers, polybutene (A) and polybutadiene (B) are apparent.

The new isotactic (crystallizable) polybutadiene is obtained by polymerizing butadiene with the aid of catalysts obtained by reacting, in given proportions, organo-metallic compounds of metals of the 3rd group of the Periodic Table with complex compounds of chromium.

Examples of these catalysts which may be used are those obtained by reacting triethyl aluminum with chromium-hexacarbonyl or with derivatives of chromium-hexacarbonyl such as chromium-dipyridine-tetracarbonyl or chromium-tripyridine-tricarbonyl, or with chromium-alkyl or aryl carbylamines.

There may also be used, as catalysts for the production of the new isotactic polybutadiene, reaction products of the organometallic compounds of metals of the 3rd group of the Periodic Table with compounds of the type: 

where R' and R" represent the same or different alkyl or aryl radicals which may contain from 1 to 12 carbon atoms.

Among the compounds of the last-mentioned type which may be reacted with, for instance, triethyl aluminum, to obtain catalysts for use in polymerizing butadiene to isotactic polybutadiene may be mentioned chromium acetyl acetonate.

In general, the catalysts which are used, in accordance with this invention, for the polymerization of butadient to isotactic polybutadiene are obtained by reacting the organo-metallic compound of the metal of the 3rd group of the Periodic Table with complex compounds of the formula $$X_mCrY_n$$

in which Y is the group CO, CNR, or $$(R'CO—CH—COR'')$$

in which R' and R" have the significance explained above and R represents an alkyl or aryl radical; X is ammonia or an organic base; $n$ is an integer from 2 to 6, $m$ is equal to $6-n$ when Y is the CO group, and is zero when Y represents the grups CNR or $$R'CO—CH—COR''$$

Compounds embraced in the foregoing general formula include those in which $$X_mCrY_n$$

is a chromium carbonyl in which one or more CO groups is (are) substituted by coordinate molecules of a base such as ammonia or organic bases such as pyridine, phenanthroline, etc., for example such compounds as chromium - triamino - tricarbonyl, chromium-dipyridine - tetracarbonyl and chromium - tripyridine - tricarbonyl as well as compounds in which $$X_mCrY_n$$

is an aliphatic or aromatic metal carbylamine such as chromium-hexaphenyl-carbylamine.

It will be apparent that the useful chromium compounds may be generally defined as complex organic compounds of chromium in which the metal is coordinated with groups containing oxygen and/or nitrogen atoms, such as carbon monoxide, isocyanides, acetyl acetone, etc.

As previously indicated, the relative proportions of the metallorganic compound of the metal of the 3rd group of the Periodic Table and the complex chromium compound used in preparing the catalyst has an important influence on the type of polybutadiene produced.

We have found that, if the complex chromium compound is combined with relatively small amounts of metallo-organic compounds, the polymer obtained is apt to be syndiotactic polybutadiene. Under those conditions, the catalysts derived from the complex chromium compounds behave in the same way as the catalysts derived from oxygenated organic compounds of other transition metals such as titanium and vanadium.

However, if the complex chromium compounds are reacted with a large excess of the metallorganic compound of the metal of the 3rd group of the Periodic Table, the catalysts obtained are specific for the polymerization of butadiene to 1,2-isotactic polybutadiene.

In fact, the factor or condition which determines whether the catalyst will be specific for the production of isotactic polybutadiene, or of syndiotactic polybutadiene, is the molar ratio between the metallorganic compound and the complex chromium compound used in preparing the catalyst.

In general, we find that when the molar ratio between the metallorganic, e.g., aluminum, compound and the complex chromium compound is 6 or below, the resulting catalysts leads to polymerization products the crystalline fraction of which has substantially the syndiotactic structure.

On the other hand, if such molar ratio is higher than 6, and particularly if it is appreciably higher than 6, the catalyst obtained yields polymerization products the crystalline fraction of which has substantially the isotactic structure.

Ratios intermediate between those which result in catalysts that yield the polymerizates having a crystalline fraction of syndiotactic structure and those resulting in catalysts which yield polymerizates having a crystalline fraction of isotactic structure, yield mixtures containing polymers of isotactic, and polymers of syndiotactic structure. The composition of such mixtures depends on the particular ratio of the catalyst-forming components. The ratios being equal, the specific complex chromium compounds used may also influence the composition of the mixtures.

In selecting the ratio of the catalyst-forming components to be reacted to produce the catalyst, the general rule is that when polymerizates comprising a very high percentage of isotactic polymer are desired the catalyst-forming components are used in molar ratios between metallorganic e.g. aluminum compound and the complex chrominum compound comprised between 8 and 20, and when polymerizates comprising a very high percentage of syndiotactic polymer are desired, the catalyst-forming components are used in a molar ratio as defined above comprised between 1 and 5. This rule applies particularly when as frequently is the case, the catalysts are not in a state of high purity.

In the organometallic compound, the radicals linked to the metal of the 3rd group of the Periodic Table may be the same or different alkyl or aryl radicals containing 1 to 16 carbon atoms. A typical organometallic compound is triethyl aluminum.

The catalyst may be prepared by suspending or dissolving the transition metal compound in the hydrocarbon solvent to be used as the polymerization medium, such as a light gasoline fraction free of olefinic bonds, n-heptane, propane, anhydrous benzene, etc., suspending or dissolving the metallorganic compound in a solvent of the same group, and then bringing the solutions or suspensions together.

The reactor in which the polymerization is carried out should be previously thoroughly dried and evacuated because it is of general advantage to carry out the entire process in the absence of oxygen and water.

The butadiene is preferably dried carefully and then pumped into the reactor.

The pressure employed is preferably held between normal atmospheric pressure and about 10 atmospheres.

The polymerization of butadiene with the aid of the catalysts of the present invention is carried out, preferably, in solution using aliphatic or aromatic hydrocarbon solvents, and operating at temperatures ranging from $-80°$ C. to $+150°$ C., preferably from $0°$ C. to $65°$ C. At temperatures within the range $0°$ C. and $65°$ C., the reaction rate is sufficiently high to be practical, and secondary reactions, such as those leading to cross-linking of the polymer chains, occur only to a very limited extent, as shown by the fact that the polybutadiene obtained is soluble, to a large degree, in hot aromatic solvents such as toluene, benzene, etc. At the higher temperatures (above $65°$ C.), some cross-linked products are formed which are insoluble in aromatic solvents even at elevated temperatures.

Temperatures below $0°$ C. can be used, and no cross-linked products are formed. However, the rate of reaction is slow for production of the polymer on a large commercial scale.

The time required to produce the polymer varies and can be from a fraction of an hour up to several days, the reaction mass being agitated during the polymerization.

The gaseous phase above the polymerization product is then vented and the product may be worked up. The mass contains, as impurities, inorganic compounds originating from the decomposition of the catalyst as well as a residue of the catalyst.

The product may be treated with a suitable reagent, for instance methanol, for decomposing and dissolving the residual catalyst. The residual catalyst may be decomposed, also, with water or other hydrolyzing agents.

The polymerizate obtained by polymerizing butadiene with the aid of the present catalysts comprises, in addition to the crystallizable polybutadiene, a variable amount of amorphous polymers in which, to a large extent, the units derived from the monomer also have the 1,2-enchainment.

The crystalline polymer can be readily separated from the amorphous products by solvent extraction, preferably in the absence of oxygen. The polymerizate may comprise low molecular weight amorphous polymers soluble in acetone, and/or higher molecular weight amorphous polymers soluble in ether. Such amorphous polymers may be separated from the crystallizable polybutadiene, which is soluble in boiling heptane or benzene, by extracting the crude polymerizate with acetone or ether, or by extracting it successively with acetone and ether.

The following examples are given to illustrate the invention, it being understood that these examples are not intended as limiting.

*Example 1*

In a 250 cc. shaking autoclave, which has been previously evacuated, are introduced in succession, 0.00225 mol of chromium-hexaphenyl-carbylamine dissolved in 50 cc. anhydrous benzene and 0.0071 mol of triethyl aluminum dissolved in 30 cc. anhydrous benzene. The autoclave is set in motion and, after a couple of minutes, 70 g. of technical (98%) butadiene are added.

The autoclave is kept in motion at the temperature of 20° C. for about 6 hours; 30 cc. methanol are then added to decompose the catalyst, and unreacted butadiene is recovered.

The reaction product is taken out and coagulation is effected by adding further methanol acidified with hydrochloric acid. The polymer, after thorough washing with methanol, is dried under vacuum at 50° C.

Thirty grams of solid polybutadiene are obtained, which are fractionated by means of successive extractions with boiling acetone, ether and benzene.

The following fractions are obtained—

Acetone extract: 29% of the total.
Ether extract: 24% of the total; amorphous at the X-rays.
Benzene extract: 11% of the total, this is crystalline, with 1,2 syndiotactic structure, by X-ray examination; the infrared examination shows that 94% of the double bonds are vinyl bonds.
Residue: 36% of the total; this is crystalline, with 1,2 syndiotactic structure, by X-ray examination; the infra-red spectrum shows that practically all the double bonds are vinyl bonds.

*Example 2*

In a 250 cc. shaking autoclave, which has been previously evacuated, are introduced in succession; 0.00106 mol of chromium-hexaphenyl-carbylamine dissolved in 50 cc. of anhydrous benzene and 0.0090 mol of triethyl aluminum dissolved in 30 cc. anhydrous benzene. The autoclave is set in motion and, after a couple of minutes, 60 g. of technical (98%) butadiene are added.

The autoclave is kept in motion at the temperature of 20° C. for about 6 hours; 30 cc. methanol are then added to decompose the catalyst, and unreacted butadiene is recovered.

The reaction product is treated as described in Example 1.

26 g. of solid polybutadiene are obtained, which are fractionated by extraction with boiling acetone, ether and benzene, to the following fractions:

Acetone extract: 39% of the total, amorphous at the X-rays.
Ether extract: 43% of the total, amorphous at the X-rays.
Benzene extract: 11% of the total. By X-ray examination this fraction is crystalline and is formed of a mixture of 1,2-syndiotactic and 1,2-isotactic polybutadiene; with prevalence of the second form.
Residue: 7% of the total. This is a highly crystalline product, consisting, as does the benzene extract, of a mixture of isotactic and syndiotactic polymer, with prevalence of the isotactic.

*Example 3*

In a 250 cc. shaking autoclave, which has been previously evacuated, are introduced in succession; 0.00102 mol of chromium-hexaphenyl-carbylamine dissolved in 50 cc. anhydrous benzene and 0.0143 mol of triethyl aluminum dissolved in 30 cc. anhydrous benzene. The autoclave is set in motion and, after 2 minutes, 50 g. of technical (98%) butadiene, are added. The autoclave is kept in motion at a temperature of 20° C. for about 10 hours. The polymerization is then stopped by addition of methanol.

The product obtained is treated as described in the previous examples. 15.25 g. of solid polymer are obtained which are fractionated by extraction with boiling acetone, ether and benzene. The following fractions are obtained;

Acetone extract: 70% of the total, amorphous at the X-rays.
Ether extract: 22% of the total, amorphous at the X-rays.
Benzene extract: 8% of the total, crystalline with 1,2-isotactic structure, by X-ray examination, intrinsic viscosity in toluene at 30° C.=5 (molecular weight approximately 440,000); first order transition temperature 123–124° C. The infra-red spectrum shows that at least 95% of the double bonds are vinyl bonds.

*Example 4*

In a 250 cc. shaking autoclave, which has been previously evacuated, are introduced in succession; 0.00107 mol of chromium-hexa-p-methoxy phenyl-carbylamine dissolved in 50 cc. anhydrous benzene and 0.0107 mol of triethyl aluminum dissolved in 40 cc. anhydrous benzene. The autoclave is set in motion and 65 g. technical (98%) butadiene are added. Operating as in the previous examples, 17 g. of solid polymer are obtained, which by fractionating in the usual way yield:

Acetone extract: 50% of the total.
Ether extract: 19% of the total, amorphous by X-ray examination.
Benzene extract: 9% of the total, crystalline with 1,2-isotactic structure by X-ray examination; the infra-red spectrum shows that approximately 95% of the double bonds consists of vinyl bonds.
Residue: 22% of the total, crystalline with 1,2-isotactic structure by X-ray examination; the presence of traces of syndiotactic polymer is noticed. The infra-red spectrum shows that at least 95% of the double bonds are vinyl bonds.

*Example 5*

In a 250 cc. shaking autoclave which has been previously evacuated, are introduced in succession; 0.00107 mol chromium-hexa-p-methoxy-phenyl-carbylamine dissolved in 50 cc. anhydrous benzene and 0.0150 mol of triethyl aluminum dissolved in 30 cc. of anhydrous benzene. The autoclave is set in motion and 35 g. of technical (98%) butadiene are added. The autoclave is kept in motion for 6 hours at a temperature of 20° C. Ten g. solid polymer are obtained, which are extracted with boiling ether in order to eliminate the amorphous portion. The residue is crystalline, with 1,2-isotactic structure, by X-ray examination, and the infra-red spectrum shows that at least 95% of the double bonds are vinyl bonds.

Example 6

In a 500 cc. round bottom flask are introduced in a nitrogen atmosphere, 0.00365 mol of chromium tripyridine-tricarbonyl suspended in 60 cc. anhydrous n-heptane. From a dropping funnel are then rapidly added 0.0128 mol aluminum triethyl dissolved in 40 cc. anhydrous n-heptane. Technical butadiene is then bubbled through the liquid at 10–15° C.; after 2 hours the reaction is stopped and methanol is added. The obtained product is purified as in the previous examples, and 4 g. of solid polymer are thus obtained, which are extracted with boiling ether, in order to remove the amorphous portion. The residue is crystalline, with 1,2-syndiotactic structure, by X-ray examination.

Example 7

In a shaking autoclave of 250 cc. capacity are introduced, in a nitrogen atmosphere, chromium-tripyridine-tricarbonyl 0.0053 mol, suspended in 30 cc. anhydrous n-heptane and triethyl aluminum 0.053 mol dissolved in 40 cc. anhydrous n-heptane.

After shaking for 2 minutes, 30 g. of technical (98%) butadiene are added. The autoclave is kept in motion for 6 hours at 10–15° C.

Thereafter, methanol is added to decompose the catalyst, and the unreacted butadiene is recovered. After purification, as in the previous examples, 7 g. of solid polybutadiene are obtained, 58% of which is soluble in ether and is amorphous by X-ray examination. 4.5% of the total is soluble in benzene; this is crystalline, with 1,2-isotactic structure, by X-ray examination, while the infra-red spectrum shows that approximately 93% of the double bonds are vinyl bonds. The residue is 37.5% of the total and is clearly crystalline, with 1,2-isotactic structure, by X-ray examination, while at least 95% of the double bonds appear to be vinyl ones by infra-red examination.

Example 8

The following ingredients are introduced in the order stated into a 0.25 l. shaking autoclave containing pure $N_2$:

| | Mols |
|---|---|
| Chromium-dipyridine-tetracarbonyl suspended in 40 cc. anhydrous n-heptane | 0.0024 |
| Triethyl aluminum dissolved in 40 cc. anhydrous n-heptane | 0.0192 |

After shaking for 3 minutes, 50 g. technical butadiene are added.

Shaking is continued for 5 hours at a temperature of 10–15° C.; the reaction is then stopped by the addition of methanol.

The resulting polymer is purified and dried as in Example 1.

6.0 g. of solid polymer are thus obtained, which by ether and benzene extraction are fractionated as follows:

Ether extract: Amorphous under the X-rays.
Benzene extract: 1,2-isotactic crystalline. The infra-red examination shows that at least 94% of the double bonds are of the vinyl type.
Residue of the benzene extraction: The X-ray examination of this residue shows its structure to the definitely crystalline, of the isotactic type. The I.R. examination shows that all the double bonds are of vinyl type.

Example 9

The following ingredients are introduced into a 0.5 l. shaking autoclave from which air has been carefully removed:

| | Mols |
|---|---|
| Chromium-acetyl-acetonate dissolved in 50 cc. benzene | 0.0028 |
| Triethyl aluminum dissolved in 50 cc. benzene | 0.028 |

After shaking for 1–2 minutes, about 80 g. technical (98%) butadiene are transferred into the vessel from a small cylinder.

Shaking is continued for about 4 hours at a temperature of 10–15° C., then the reaction is stopped by addition of 20 cc. of methanol.

The unreacted butadiene is recovered and the polymer obtained is coagulated with methanol and diluted hydrochloric acid, thoroughly washed with methanol and vacuum dried at temperatures not in excess of 50° C.

Eleven g. of polymer are obtained, which are then fractionated by successive extraction with acetone, ether and benzene. The fraction which is insoluble in acetone and ether, but soluble in boiling benzene, is crystalline, of the isotactic type.

The infra-red examination of this fraction shows that at least 95% of the monomeric units have a 1,2-enchainment.

Example 10

The following ingredients are introduced in the order given into a shaking 0.5 l. autoclave, previously evacuated and filled with pure $N_2$:

| | Mols |
|---|---|
| Chromium-hexacarbonyl | 0.004 |
| Triethyl aluminum dissolved in 110 cc. anhydrous n-heptane | 0.0285 |

Shaking of the autoclave is then started and continued for about 6 hours at a temperature of 60–65° C. The reaction is stopped by addition of methanol, and the resulting reaction product is treated several times with methanol acidified with hydrochloric acid, then washed with pure methanol and vacuum dried.

11.2 g. of solid polymer are obtained, which by successive extractions with boiling ether and n-heptane are fractioned as follows:

Ether extract: Amorphous under the X-rays.
Heptane extract: The X-ray examination of this extract shows its structure to be isotactic crystalline. The infra-red examination of this fraction demonstrates that at least 93% of the double bonds are of the vinyl type.
Residue of the heptane extraction: has the same structure as the heptane extract.

Example 11

In a 500 cc. round bottom flask, which has been previously evacuated and filled with pure nitrogen, 0.003 mol of chromium-triamino-tricarbonyl suspended in 70 cc. of anhydrous n-heptane, are introduced. From a dropping funnel is then added, in about 2 minutes, the solution of 0.018 mol of triethyl aluminum in 30 cc. anhydrous n-heptane.

Technical (98%) butadiene is bubbled through for several hours, keeping the temperature at 20° C.; the reaction is then stopped by adding 25 cc. methanol. The product is completely coagulated by further addition of methanol and purified as described in the previous examples.

After extraction with boiling ether to eliminate the amorphous portion, a residue is obtained, which is crystalline with 1,2-syndiotactic structure, by X-ray examination, while impurities of isotactic polymer are present.

Example 12

In a 500 cc. round bottom flask, which has been previously evacuated and filled with pure nitrogen, 0.0031 mol chromium-triamino-tricarbonyl suspended in 70 cc. of anhydrous n-heptane, are introduced. From a dropping funnel is then added, in about 2 minutes, the solution of 0.0435 mols triethyl aluminum in 30 cc. anhydrous n-heptane.

Technical (98%) butadiene is then bubbled through for several hours, keeping the temperature at 20° C.; the reaction is stopped after 2 hours by adding 25 cc. methanol.

The product is completely coagulated by further addition of methanol and purified as described in the previous examples.

After extraction with boiling ether to eliminate the amorphous portion, a residue is obtained which is crystalline, with 1,2-isotactic structure, by X-ray examination. The infra-red spectrum shows that at least 95% of the double bonds are of vinyl type.

The crystallizable (isotactic) 1,2-polybutadiene can be used as a plastic material for the production of laminates and for the production of molded articles by conventional extrusion and injection molding methods. Both the crystallinity and the solubility of the polybutadiene and of the articles formed therefrom are lowered by the occurrence of cross-links in the polymer structure.

Where the lower crystallinity and reduced solubility are desired, cross-links can be introduced between the polymer chains by chemical after-treatment of the polymer, the cross-links being formed during the molding step. Thus, the 1,2-isotactic polybutadiene may be mixed, prior to molding thereof, with small amounts (e.g. from 0.1 to 20%) of vulcanization aids such as sulfur, vulcanization accelerators, such as mercaptobenzothiazole, tetramethylthiouram disulphide etc. or substances generating free radicals, for example benzoyl peroxide, cumyl peroxide, etc. and then molding the mixture.

Cross-links between the chains of the polybutadiene can also be established by subjecting the polymer to beta- or gamma-radiations.

The 1,2-isotactic polybutadiene of the invention can also be extruded to filaments which, after stretching, possess mechanical properties that compare favorably with those of the best types of presently available synthetic fibers.

Plasticizers can be mixed with the isotactic 1,2-polybutadiene. These include Dutrex, Circosol, Califlux, and similar oils, used as extenders for conventional types of synthetic rubbers. Substances like styrene, which act as plasticizers when mixed with the polymer in small amounts, may then copolymerize with the isotactic polybutadiene by the action of catalyst or promoters which supply free radicals, such as those types of agents mentioned hereinabove.

Because of the high reactivity of the vinyl groups present therein, the 1,2-polybutadiene can be copolymerized with monomers of different types, and different kinds of functional groups can be introduced into it.

The new polybutadiene is charactreized by the prevailing 1,2-enchainment structure and isotactic configuration, by the identity period along the chain, as determined by X-ray analysis, of about 6.5 A., and by the fact that at least 90% of the double bonds are of the vinyl type. The ultimate melting temperature may be above or below 120° C., and the polymer is highly crystalline or crystallizable at temperatures below the ultimate melting temperature.

Some changes may be made in practicing our invention, such as changes in the specific conditions of the polymerization and choice of catalyst from the types defined, and as specifically exemplified without departing from our invention. It is to be understood, therefore, that we intend to claim as part of our invention any variations, substitutions and changes that lie within the scope of our invention and of the appended claims, and intend to include within the scope of said claims such changes as may be apparent to those skilled in the art in the practice of the principles of our invention as set forth in this specification.

What is claimed is:

1. As a new product, isotactic polybutadiene.
2. Linear, solid polybutadiene in which the units derived from the monomer and making up the macromolecules have prevailingly 1,2-enchainment, and in which the double bonds are prevailingly of the vinyl type, said polybutadiene comprising crystalline macromolecules of isotactic structure characterized by an identity period along the main chain of about 6.5 A., as determined by X-ray analysis.
3. Linear, solid polybutadiene consisting of macromolecules in which the units derived from the monomer and making up the macromolecules have substantially all 1,2-enchainment, and in which more than 90% of the double bonds are of the vinyl type, said polybutadiene being further characterized in that the 1,2 units have prevailingly the isotactic structure, with an identity period along the main chain of about 6.5 A., in being partially crystalline when examined under the X-rays, and in having an ultimate melting point above room temperature but below 120° C.
4. Shaped articles comprising the isotactic polybutadiene of claim 3.
5. Shaped articles comprising the isotactic polybutadiene as defined in claim 3 and vulcanized by cross-linking of the molecules thereof.
6. Linear, solid polybutadiene consisting of macromolecules in which the units derived from the monomer and making up the macromolecules have substantially all 1,2-enchainment, and in which more than 90% of the double bonds are of the vinyl type, said polybutadiene being characterized in that substantially all of the 1,2 units have the isotactic structure with an identity period along the main chain of about 6.5 A., in being highly crystalline when examined under the X-rays, and in having an ultimate melting point of 120° C. to 125° C.
7. Shaped articles comprising the isotactic polybutadiene of claim 6.
8. Shaped articles comprising the isotactic polybutadiene as defined in claim 6 and vulcanized by cross-linking of the molecules thereof.
9. A process for producing solid, linear, butadiene homopolymers characterized in that the units derived from the monomer have prevailingly a 1,2-enchainment and the macromolecules thereof show isotactic structure and exhibit isotactic type crystallinity at the X-rays, which process comprises polymerizing butadiene at a temperature between —80° C. and +150° C., under a pressure of from normal atmospheric pressure to about 10 atmospheres, and in contact with a catalyst obtained by mixing triethyl aluminum with a complex chromium compound having the general formula $$X_m Cr Y_n$$

in which Y is selected from the groups consisting of CO and CNR in which R represents a radical selected from the group consisting of alkyl and aryl radicals containing from 1 to 12 carbon atoms; X is selected from the group consisting of ammonia and pyridine; $n$ is an integer from 2 to 6; $m$ is equal to 6—$n$ when Y is the CO group and is zero when Y is a CNR group, the molar ratio between the aluminum compound and the chromium compound being greater than 6.0, to obtain a crude homopolymerizate consisting essentially of a mixture of amorphous, non-crystallizable butadiene homopolymers in which the units derived from the monomer have prevailingly 1,2-head-to-tail enchainment, and the crystalline butadiene homopolymers, the macromolecules of which show the isotactic structure, and separating the crystalline homopolymers from the amorphous non-crystallizable homopolymers by extracting the crude homopolymerizate with a solvent for the amorphous, non-crystallizable homopolymers.

10. The process according to claim 9, characterized in that the molar ratio between the aluminum compound and the chromium compound is between 8 and 20.
11. The process according to claim 9, characterized in that the polymerization is conducted in the substantial absence of oxygen and water.
12. The process according to claim 9, characterized in that the polymerization is conducted in a hydrocarbon solvent medium.

13. The process as described in claim 9, characterized in that the polymerization is conducted in a hydrocarbon solvent medium and in the substantial absence of oxygen and water.

14. The process according to claim 9, characterized in that the complex chromium compound is a chromium-carbonyl.

15. The process according to claim 9, characterized in that the complex chromium compound is a chromium-hexacarbonyl.

16. The process according to claim 9, characterized in that the complex chromium compound is a chromium carbonyl in which at least one of the CO groups is substituted by a coordinate pyridine equivalent molecule.

17. The process according to claim 9, characterized in that the complex chromium compound is chromium-tri-pyridine-tricarbonyl.

18. The process according to claim 9, characterized in that the complex chromium compound is chromium-tri-amino-tricarbonyl.

19. The process according to claim 9, characterized in that the complex chromium compound is a chromium carbylamine.

20. The process according to claim 9, characterized in that the complex chromium compound is chromium-hexa-phenyl-carbylamine.

21. The process according to claim 9, characterized in that the complex chromium compound is chromium-hexa-p-methoxyphenyl-carbylamine.

22. The process according to claim 9, characterized in that the butadiene is polymerized at a temperature in the range from 0° C. to 65° C.

23. The process according to claim 9, characterized in that the butadiene is polymerized at a temperature in the range from 0° C. to 50° C.

24. The process according to claim 9, characterized in that the non crystallizable homopolymers are separated by extracting the crude homopolymerizate with aliphatic ketones and aliphatic ethers.

25. The process according to claim 9, characterized in that low molecular weight non-crystallizable homopolymers are separated by extracting the crude homopolymerizate with acetone and higher molecular weight amorphous homopolymers are separated by extracting the crude homopolymerizate with ether.

References Cited in the file of this patent

UNITED STATES PATENTS

| | | |
|---|---|---|
| 2,842,474 | Pratt | July 8, 1958 |
| 2,882,264 | Barnes et al. | Apr. 14, 1959 |

FOREIGN PATENTS

| | | |
|---|---|---|
| 533,362 | Belgium | May 16, 1955 |
| 538,782 | Belgium | Dec. 6, 1955 |
| 543,292 | Belgium | June 2, 1956 |

OTHER REFERENCES

Gaylord and Mark: Linear and Stereoregular Addition Polymers, Interscience Publishers Inc., New York, 1959, pages 160–161.

Natta: La Chimica E L'Industria, 37, October 1955, page 888.

Natta: Makromolekulare Chemie, 16, 213–237, September 1955.

Natta et al.: Atti Accad. Lincei, 19 (8), 229, November 1955.

Binder: Industrial and Engineering Chemistry, volume 46, No. 8, page 1729, August 1954.

Whitby: Synthetic Rubber, pages 293, 324, 755, John Wiley & Sons, Inc., New York, 1954.